US008984218B2

(12) United States Patent
Weirauch

(10) Patent No.: US 8,984,218 B2
(45) Date of Patent: Mar. 17, 2015

(54) DRIVE INDICATING MECHANISM FOR REMOVABLE MEDIA

(75) Inventor: Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2426 days.

(21) Appl. No.: 11/166,845

(22) Filed: Jun. 24, 2005

(65) Prior Publication Data

US 2006/0291084 A1 Dec. 28, 2006

(51) Int. Cl.
*G06F 17/40* (2006.01)
*G11B 19/04* (2006.01)

(52) U.S. Cl.
CPC ..................... *G11B 19/04* (2013.01)
USPC ............... 711/112; 711/4; 711/141

(58) Field of Classification Search
CPC ...................................................... G06F 12/00
USPC .............................................. 711/4, 112, 141
See application file for complete search history.

(56) References Cited

U.S. PATENT DOCUMENTS

| | | | |
|---|---|---|---|
| 5,297,258 A * | 3/1994 | Hale et al. ..................... 711/114 |
| 5,940,854 A | 8/1999 | Green, Jr. et al. |
| 6,108,156 A * | 8/2000 | Lee et al. .......................... 360/75 |
| 6,330,210 B1 | 12/2001 | Weirauch et al. |
| 6,600,614 B2 | 7/2003 | Lenny et al. |
| 6,625,732 B1 | 9/2003 | Weirauch et al. |
| 6,823,329 B2 * | 11/2004 | Kirk et al. .............................. 1/1 |
| 7,031,085 B2 * | 4/2006 | Miller et al. ..................... 360/48 |
| 7,039,295 B1 * | 5/2006 | Moon et al. ...................... 386/95 |
| 7,245,823 B2 * | 7/2007 | Moon et al. ...................... 386/95 |
| 7,805,563 B2 * | 9/2010 | Topham ........................ 711/111 |
| 2001/0002846 A1 | 6/2001 | Onishi |
| 2001/0048659 A1 | 12/2001 | Weirauch et al. |
| 2002/0126407 A1 | 9/2002 | Blaum et al. |
| 2002/0126992 A1 | 9/2002 | Sakuramoto |
| 2003/0035565 A1 | 2/2003 | Rhoads |
| 2003/0084262 A1 | 5/2003 | Weirauch |
| 2003/0163719 A1 | 8/2003 | Ebihara |
| 2003/0191952 A1 | 10/2003 | Anderson et al. |
| 2003/0194214 A1 | 10/2003 | Anderson et al. |
| 2003/0236993 A1 | 12/2003 | McCreight et al. |

(Continued)

FOREIGN PATENT DOCUMENTS

CN 1101160 4/1995
CN 1426063 6/2008

(Continued)

OTHER PUBLICATIONS

I. Sanchez et al., "Method for Tracking Programs and Data Storage Media," IBM Technical Disclosure Bulletin vol. 37, No. 8, Aug. 1994, pp. 257-258.

(Continued)

*Primary Examiner* — Tuan Thai
(74) *Attorney, Agent, or Firm* — Conley Rose, P.C.

(57) ABSTRACT

A system (and associated method) comprises a storage drive and a central processing unit ("CPU"). The storage drive is adapted to accommodate a removable storage medium. The CPU is configured to execute code to cause the CPU to write data to an addressable unit of the storage medium and also to write an identifying value to the addressable unit. The identifying value is indicative of an identity of the system or the storage drive.

31 Claims, 2 Drawing Sheets

(56) References Cited

U.S. PATENT DOCUMENTS

| | | |
|---|---|---|
| 2004/0042363 A1 | 3/2004 | Kobayashi et al. |
| 2004/0085229 A1 | 5/2004 | Weirauch |
| 2004/0088556 A1 | 5/2004 | Weirauch |
| 2006/0026432 A1 | 2/2006 | Weirauch et al. |
| 2006/0123190 A1 | 6/2006 | Weirauch et al. |
| 2006/0291084 A1 | 12/2006 | Weirauch |

FOREIGN PATENT DOCUMENTS

| | | |
|---|---|---|
| EP | 0785547 B1 | 7/2002 |
| EP | 1349058 A1 | 10/2003 |
| JP | 19924017160 | 1/1992 |
| JP | 19950152497 | 6/1995 |
| JP | 19980283265 | 10/1998 |
| JP | 19991185383 | 7/1999 |
| JP | 2000010876 | 1/2000 |
| JP | 2000353056 | 12/2000 |
| JP | 2004134044 | 4/2004 |
| JP | 2006050017 | 2/2006 |
| JP | 2006079733 | 3/2006 |
| JP | 2006164283 | 6/2006 |

OTHER PUBLICATIONS

I. Sanchez, et. al., "Method for Tracking Programs and Data Storage Media", IBM, Technical Disclosure Bulletin, vol. 37, No. 8, Aug. 1994, pp. 2.

Universal Serial Bus; Wikipedia Version as at Jun. 24, 2004.

* cited by examiner

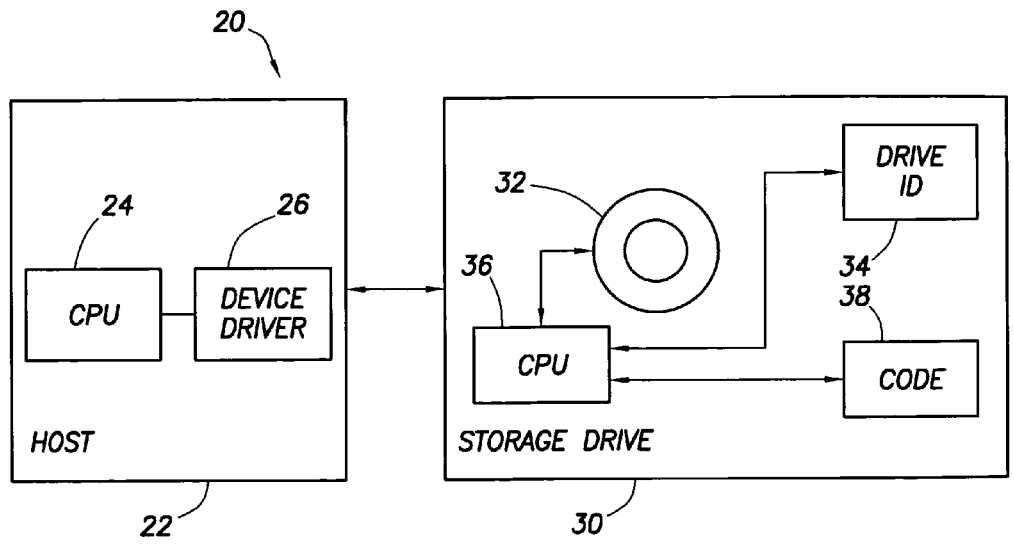
FIG.1
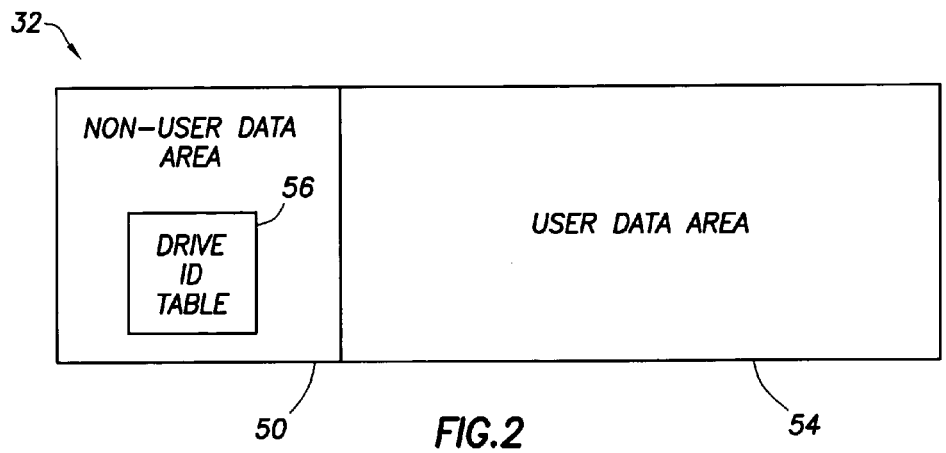
FIG.2
| ADDR. UNIT 1 | ADDR. UNIT 2 | ADDR. UNIT 3 | ADDR. UNIT 4 | ADDR. UNIT 5 | . . . |
|---|---|---|---|---|---|
| INDEX 01 | INDEX 01 | INDEX 02 | INDEX 03 | INDEX 01 | . . . |
FIG.4

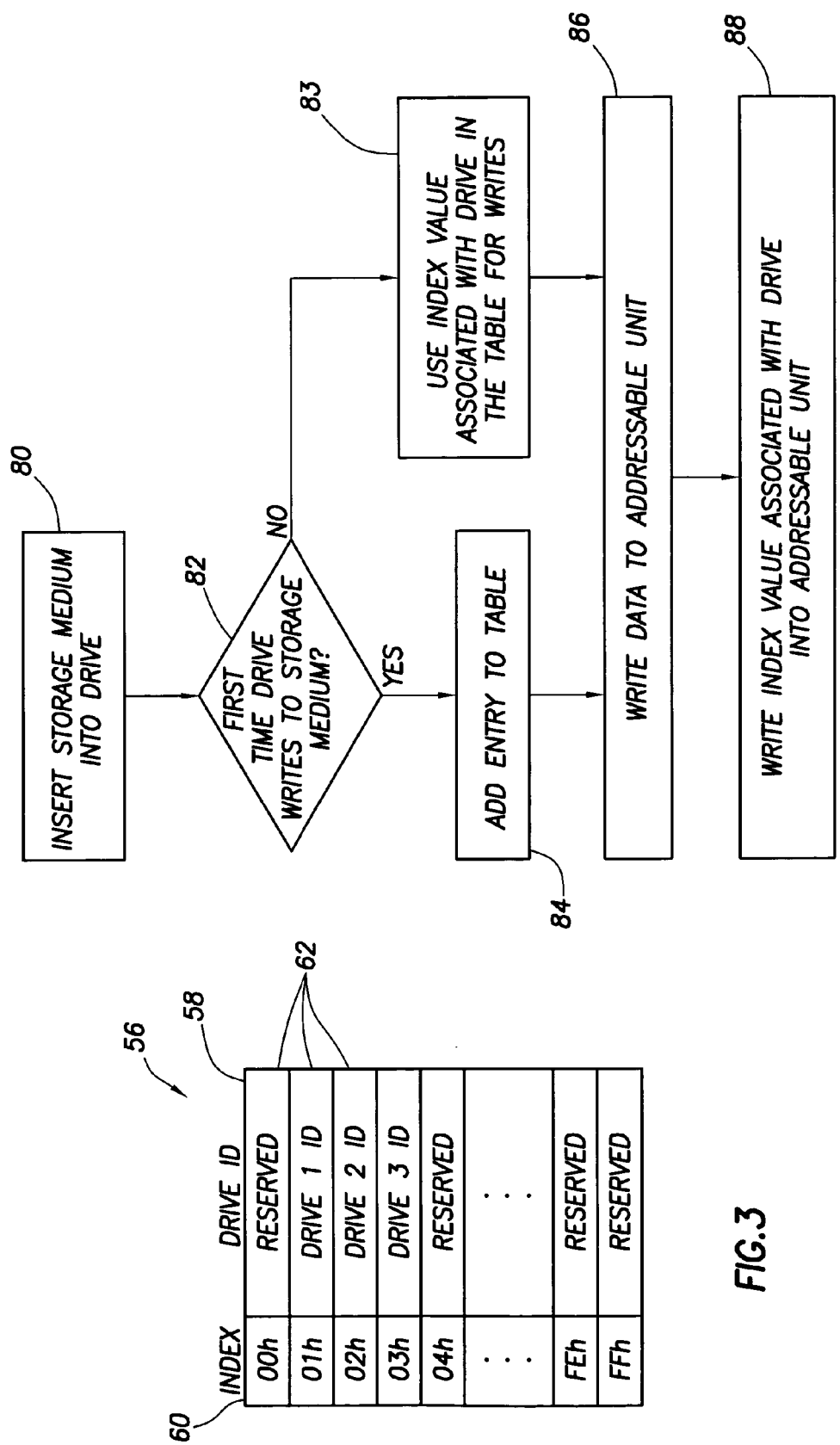

DRIVE INDICATING MECHANISM FOR REMOVABLE MEDIA

BACKGROUND

Some electronic systems include a storage drive that can store data on a removable storage medium. Because the storage medium is removable, the data on the storage medium can be written by one or more storage drives. Further, one or more portions (e.g., sectors) of a storage medium may malfunction. The malfunction may be caused by the storage medium itself or by a drive while accessing the storage medium. Having information by which such malfunctions may be diagnosed would be desirable.

BRIEF DESCRIPTION OF THE DRAWINGS

For a detailed description of exemplary embodiments of the invention, reference will now be made to the accompanying drawings in which:

FIG. 1 shows a system in accordance with an exemplary embodiment of the invention;

FIG. 2 illustrates an embodiment in which a drive identifier table is included on a storage medium;

FIG. 3 shows an exemplary embodiment of the drive identifier table of FIG. 2;

FIG. 4 shows an example of a portion of a storage medium in which index values identifying individual storage devices are stored in the addressable units of the medium; and FIG. 5 shows an exemplary method embodiment.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The verb "record" means to store, write, or otherwise transfer data onto a storage medium. The term "system" refers to a collection of two or more components and may be used, for example, to refer to a computer system or a subsystem of a computer (e.g., a storage drive).

DETAILED DESCRIPTION

FIG. 1 illustrates a system 20 implemented in accordance with an exemplary embodiment of the invention. As shown, system 20 comprises a host 22 coupled to a storage drive 30. In general, the host 22 stores data on, and reads data from, the storage drive. As such, the host 22 represents a source of data for the storage drive and/or represents a consumer of data retrieved from the storage drive for use by the host 22 or other device. The host 22 may be implemented as a computer and the storage drive 30 may be external to the computer or may be located internal to the computer. The host 22 includes a central processing unit ("CPU") 24 and a device driver 26. The device driver 26 comprises software that is executed by the CPU 24 and may cause the CPU to perform one or more of the actions described herein. The host 22 may also contain other components not specifically shown for sake of clarity.

The storage drive 30 is adapted to receive a removable storage medium 32 as may be inserted by a person or by a machine (e.g., an automated, tape drive loading system). The storage medium 32 may comprise any suitable type of medium such as an optical disk, a magnetic disk, solid state memory, etc. Further, the storage medium may be implemented as a "write-once" medium or a "re-writeable" storage medium. Data can be recorded onto a write-once medium more than once, but once data is written to a write-once medium (e.g., CD-R), such data cannot be overwritten or erased. Data on a re-writeable storage medium can be overwritten or erased.

The storage drive 30 may also include a CPU 36 and code 38 that can be executed by the CPU 36. One or more of the acts described herein may be performed by the storage drive's CPU 36 executing the code 38. Moreover, all of the acts described herein may be performed by the code 38 or by the device driver 26. In other embodiments, some of the acts described herein may be performed by the device driver 26 while other acts are performed by the code 38. The following discussion refers to the code 38 performing various actions, but in other embodiments device driver 26 may additionally or alternatively be used.

The storage drive 30 also comprises an identifying value such as a drive identifier ("ID") 34 that may uniquely identify the associated drive apart from all other drives. For example, the drive ID may comprise a serial number assigned by the drive manufacturer. In other embodiments, the drive ID 34 may be unique to at least some, but not all, other drives. It is generally sufficient for purposes of the subject matter disclosed herein that the drive ID 34 is such that there is a sufficiently low probability that the same storage medium 32 may be used in two or more drives having the same drive ID. The term "unique" (as in "unique" drive ID) is used in both contexts in this disclosure. The drive ID 34 may be stored in non-volatile memory in the storage drive 30 or may be hard-coded into the drive's circuitry (e.g., in unique patterns on traces formed on a printed circuit board contained in the drive). In some embodiments, the drive ID is permanent and thus not alterable. It is also suitable for the drive ID to be permanent, or at least difficult to alter without specialized equipment or processes. In other embodiments, the drive ID comprises an identifier of the host 22 instead of, or in addition to, an identifier of the drive. Further still, the drive ID comprises publicly available information pertaining to the system 10 or a user of system 10. The drive ID may additionally or alternatively contain private information that is lawfully retrievable pursuant to a valid legal process (e.g., a search warrant) to protect the privacy of a user of the system 10.

The drive ID 34 may comprise a value containing alphanumeric characters and/or other symbols. In at least one embodiment, the drive ID 34 comprises a 64-bit value comprising a manufacturer code (16 bits), a model code (16 bits) and a serial number (32 bits). Each different storage drive manufacturer may be assigned a unique manufacturer code and with 16 bits, there are more than 65,000 different manufacturer codes possible. Each different model, including revisions if desired, of a storage device may also be assigned a unique model code. With 16 bits used for the model code, there are more than 65,000 uniquely available model codes. The serial number generally is unique to each drive. As such, two drives of the same model and provided by the same manufacturer will still have different drive IDs because the serial number component of the drive IDs will differ. The three components of the drive ID (manufacturer code, model code, and serial number) may be concatenated together or otherwise combined or used together in any suitable manner.

In an alternative embodiment, every drive of a particular model may have the drive ID encoded in firmware running in the drives. In this embodiment, each drive of a particular model has the same 32-bit serial number. If the firmware is upgraded, the drive serial number is not changed and is still available. In accordance with another embodiment, the drive ID is generated by the host (e.g., by the CPU 24 in accordance with the device driver 26). When the drive is installed, the driver may prompt the operator for a number, which might, for example, be a human-readable serial number printed on the drive but not readable by the drive controller electronics. Alternatively, just the manufacturer number and model number could be manually entered and the device driver 26 could generate a random 32-bit serial number. Alternatively, the device driver could generate a serial number from a unique number associated with the host computer, such as a serial number of the firmware (e.g., BIOS) for the host. If the device driver provides the serial number, either the device driver should save the number in non-volatile memory, or the device driver should employ a deterministic algorithm to always recreate the same number every time the driver is loaded. If the device driver provides the serial number, the drive may obtain the drive identification from the device driver at initialization time.

In general, recorded data is formatted into addressable units that may be referred to in a variety of ways. Examples include sectors, blocks, clusters, tracks, and groups of other units such as an error correction code ("ECC") block which contains a predefined number of sectors. In the following discussion, the term "addressable unit" is used to generically refer to any of the units of storage listed above or other known units of storage.

FIG. 2 depicts an embodiment of the storage medium 32 as comprising a non-user data area 50 and a user data area 54. The user data area 54 is where data is stored by drive 30 on behalf of an application running on the host 22. For example, a file, such as a document or a spreadsheet, that a user desires to store on the storage medium is stored by the drive 30 in the user data area. The non-user data area 50 is generally unusable for storing user data and, instead, is used for control and administration purposes. In accordance with at least some embodiments of the invention, the non-user data area 50 may comprise a "lead-in" area of the storage medium such as that disclosed in U.S. Pat. No. 6,330,210, incorporated herein by reference. In the embodiment of Figure, the non-user data area 50 contains a drive ID table 56. The drive ID table 56 may be initialized by the drive's CPU 36, under execution of code 38. Initializing the drive ID table may comprise reserving a portion of the non-user data area 50 for storing the table.

FIG. 3 shows an embodiment of the table 56. The table 56 is configured to contain one or more entries 62. As shown in FIG. 3, each entry 62 comprises at least a drive ID field 58. The drive ID field 58 is adapted to store a drive ID (such as those described above) associated with a storage drive. Each entry 62 may also include an index field 60. As such, each entry 62 in the table 56 may include an index value and a corresponding drive ID. For example, index value 01h ("h" indicating hexadecimal) corresponds to the ID for drive 1 (DRIVE 1 ID). Similarly, indices 02 h and 03 h correspond to DRIVE 2 ID and DRIVE 3 ID. At least some entries 62 may be reserved for future use to store drive IDs. In the embodiment shown in FIG. 3, an index field 60 is included in the table for storing index values. In other embodiments, index field 60 is not explicitly included in table 56 and, instead, the index value for each drive ID is inferred based on the location in the table of the drive ID value being referenced. For example, drive 2 is in the second entry (in a 0-based indexing scheme) of the table and thus is drive 2 is considered to be associated with an index value of 2.

In accordance with various embodiments of the invention, each time an addressable unit of the storage medium 32 is written with data by a storage drive 30, the storage drive's CPU 36, under control of code 38, also writes an index value into the addressable unit being written with data. The index value written into the addressable unit of the storage medium 32 corresponds to the particular storage drive 30 that is performing the write operation. The index value written to the addressable unit corresponds to the ID of the drive as reflected by way of the drive ID table 56. For example, if drive 1 writes an addressable unit of the storage medium, then, in addition to the data, drive 1 also writes its corresponding index value into the addressable unit. Moreover, each addressable unit of storage medium 32 in which data is written is also written with an index value that identifies the particular storage drive 30 that was used to write the addressable unit.

FIG. 4 illustrates a portion of the addressable units of a storage medium 32. The portion shown in FIG. 4 includes addressable units 1, 2, 3, 4, and 5. Each addressable unit includes a data portion 70 and an index value 72. The index value 72 may be included as part of a header associated with each addressable unit. In some embodiments, an addressable unit header may include an address, control information, and other information as well as one or more reserved fields. One of the reserved fields may be used to store the index value. In the example of FIG. 4, drive 1 was used to write data to addressable units 1, 2, and 5 and drives 2 and 3 were used to write data to addressable units 3 and 4, respectively. Drive 1 may have also been used to write data to addressable units 3 and 4, but drives 2 and 3 subsequently overwrote whatever data may have been stored in addressable units 2 and 3, and accordingly updated the associated index values. The index values 72 identify the drives that have most recently written the addressable units. The storage medium 32 may also be used in conjunction with "legacy drives." A legacy drive is a drive that is not equipped to write a drive ID to the storage medium as described herein. Instead, a legacy drive may cause a predetermined value such as 00 h to be written to the location in the addressable unit at which a drive ID would otherwise be written by a drive as described herein.

It may happen that all of the entries in the drive ID table 56 are written with drive IDs and, if implemented in the table, index values. When this happens and in accordance with at least some embodiments, a new storage drive that attempts to write data to an addressable unit (i.e., a drive whose drive ID is not already stored in table 56) may cause a reserved value such as 00 h or FFh to be written to the addressable unit(s) instead of the drive ID. In other embodiments, once the table 56 becomes full, the drive IDs in the table can be erased by way of a user-initiated maintenance procedure. An offset value can then be stored as part of the table or elsewhere on the storage medium. This offset value represents the number of entries in the table 56 and is used to compute new indices for additional drives. For example, if the table 56 has 32 entries and all 32 entries are occupied with drive IDs (i.e., 32 drive IDs of 32 different drives), all 32 drive IDs can be erased from the table. In this example, the offset value will be 32. When a drive subsequently attempts to write to an addressable unit, that new drive, being the first drive to write the storage medium following the erasure of the table 56, will be assigned an index value of 33 which is computed by adding an initial index value of 1 to the offset value of 32. Similarly, the next drive to write the storage medium will be assigned an index value of 33, and so on. The index values actually stored in the table 56 will be 1, 2, 3, etc., but are added to the offset value 32 when the table 56 is accessed.

FIG. 5 illustrates a corresponding method comprising blocks 80-88. One or more of the acts depicted in FIG. 5 can be performed concurrently or sequentially and one or more acts can be omitted as desired. Further, the acts can be performed in a different order than that shown in FIG. 5. At block 80, a user inserts a storage medium 32 into a storage drive 30. At some point, the storage drive 30 may write to the storage medium 32. At block 82, the storage drive 30 determines if that particular drive has previously recorded data to storage medium 32 by examining the storage medium's table 56. If the storage drive 30 has never before written data to the storage medium 32, then the drive ID of the storage drive 30 will not be present in table 56. However, if the storage drive 30 has previously written data to the storage medium 32, then the drive ID of the storage drive 30 will be present in table 56. If this is the first time this particular storage drive 30 has written data to this particular storage medium 32, then at block 84 the drive's CPU 36 modifies the storage medium's drive ID table 56 by adding the drive's ID value to the table corresponding to a previously unused index value. Such a drive, for example, may add its drive ID to the table at the entry corresponding to index value 04 h, which was previously marked as "reserved." If the drive already has written the storage medium 32, then the storage medium's drive ID table should already have an entry contained therein that lists the ID of the drive and at block 83, the drive's CPU will use the index associated with its drive's ID found in drive ID table 56. At block 86, the storage drive 30 writes data to the addressable unit on storage medium 32. At block 88, the drive 30 writes its index value to the addressable unit that is being written with data. In some embodiments, blocks 86 and 88 are performed as one act, that is, data and the drive ID are written to the addressable unit in one write transaction. In some instances, the drive ID table will not be updated prior to writing data and the drive's CPU 36 will keep track of new index value and wait to record it to the drive ID table 56 at some later point prior to ejecting the storage medium 32 or powering down the system. Any change to the drive ID table 56 is written before, during, or after writing data to the addressable units, but before ejecting the media from the storage drive.

In accordance with the embodiments described above, index values are stored in the addressable units as the identifying values by which to identify the drives writing the addressable units. The table 56 can be used to identify the particular drive that wrote an addressable unit given the associated index value. In some embodiments, the index value associated with a particular drive is stored in table 56 as shown in FIG. 3, but in other embodiments, the index value of a particular drive is inferred from that drive's location in the table. In some embodiments, the drive ID itself (or a system identifier) can be written to the addressable unit as the identifying value, rather than a corresponding index value. In this latter embodiment, the drive ID table (which facilitates a conversion between index values and drive IDs) is not used.

In some embodiments (e.g., legacy drives), a drive identifying value may not be available and a predetermined value (e.g., 00 h) is stored in the addressable unit of the medium. Also, it may be that all possible drive identifiers (e.g., index values) are already in use and thus none are available for a new drive. In this case, a predetermined value is used to store in the addressable unit of the medium in place of a drive-identifying index value.

The embodiments described above result in storage media that contain audit information that can be used to identify which drives wrote specific addressable units of the storage media. This audit information can be used in a variety of ways. For example, if an addressable unit of a storage medium 32 is determined to be defective and the index value written to that addressable unit can be determined, then, by examining the drive ID table, a determination can be made as to which drive last wrote to that particular addressable unit. The defect to the addressable unit may be caused by a problem with a particular storage device that can uniquely be identified by information in the addressable unit(s) written by the storage device and the medium's drive ID table. Accordingly, in some embodiments, a method may be performed by a computer system having a processor and executing software suitable to implement the method. The method so performed comprises retrieving information from the removable storage medium 32 and, based on the information, determining which of a plurality of storage drives was used to store the data on the removable storage medium. Specifically, the computer system receives the removable storage medium and the computer system's software is executed to perform the method to determine which one or more storage drives previously wrote data to the removable storage medium. The act of retrieving the information explained above comprises retrieving a table 56 from the removable storage medium. The act of retrieving the information also comprises retrieving any index values stored in the addressable units of the removable storage medium that have previously been written with data. The method further entails examining the table 56 and determining if any index value(s) read from any of the addressable units on the storage medium contain matches to any index values contained in the table. The drive IDs stored in the table provide a mechanism by which the identity can be ascertained of any drive that has previously written data to an addressable unit of the storage medium and whose index value is stored at such addressable unit.

Numerous variations and modifications will become apparent to those skilled in the art once the above disclosure is fully appreciated. For example, the teachings provided herein are applicable to computer systems as well as standalone storage devices such as optical disc video recorders.

What is claimed is:

1. A system in which a removable storage medium can be used, comprising:
   a storage drive adapted to accommodate the removable storage medium, said removable storage medium comprising a plurality of individually addressable units and a table adapted to contain a plurality of drive identifiers, each drive identifier associated with a different drive and uniquely distinguishing the associated drive from other drives with which the storage medium can be used; and
   a central processing unit ("CPU") configured to execute code to cause the CPU to write data to any of said addressable units of the storage medium and also to write an index value to each addressable unit written with data and to write a drive identifier associated with said index value to said table, said index value identifying a location in said table of the drive identifier, said index value being a different value than said drive identifier;
   wherein said table is stored in one or more addressable units that are different than each addressable unit in which an index value is written.

2. The system of claim 1 wherein each addressable unit comprises a sector.

3. The system of claim 1 wherein each addressable unit comprises a predetermined number of sectors to form an error correction code ("ECC") block.

4. The system of claim 1 wherein said table does not explicitly comprise any index values.

5. The system of claim 1 wherein, the first time the storage drive attempts to write data to the storage medium, the code causes the CPU to determine the drive identifier for the storage drive and write said drive identifier into said table.

6. The system of claim 1 wherein the table also comprises the index value associated with each drive identifier.

7. The system of claim 1 wherein said index value comprises a predetermined value when no index value is available.

8. The system of claim 1 wherein said index value comprises a predetermined reserved value when said table is full.

9. The system of claim 1 wherein, when the table is full of drive identifiers and a new drive identifier is to be added to the table, then the system overwrites the table, sets an offset value, writes the offset value to the table, and constructs the index value based on the offset value.

10. The system of claim 1 wherein the code causes the CPU to determine whether the storage drive has previously written to the storage medium.

11. The system of claim 1 wherein the CPU is included within the storage drive.

12. A storage drive adapted to receive a removable storage medium including a plurality of addressable units, the storage drive comprising:
    code that is adapted to be executed by a central processing unit ("CPU"); and
    a drive ID that is indicative of an identity of said storage drive;
    wherein said code causes said CPU to store an index value corresponding to said drive ID in an addressable unit when said addressable unit is accessed and to store a drive ID associated with said index value in a data structure stored in a location different than said addressable unit in which the index value is stored, said index value identifies a location of said drive ID in the data structure, and said index value being a different value than said drive ID.

13. The storage drive of claim 12 wherein said code causes said CPU to write data to an addressable unit and to store said index value in a header portion of said addressable unit.

14. The storage drive of claim 12 wherein said code causes said CPU to determine if said storage drive has previously accessed said storage medium received therein and, if not, causes said CPU to update said data structure with said drive ID and said index value indicative of said drive ID.

15. The storage drive of claim 12 wherein said code causes said CPU to write data to an addressable unit and to store a predetermined reserved value as said index value in a header portion of said addressable unit if a drive ID is not available.

16. The storage drive of claim 12 wherein said code causes said CPU to write data to an addressable unit and to store a predetermined value as said index value in a header portion of said addressable unit if all available index values have previously been used.

17. The storage drive of claim 12 wherein said data structure includes said drive ID, but not said index value.

18. A method, comprising:
    writing data by a storage drive to a plurality of addressable units on a removable storage medium;
    writing an index value by the storage drive to each addressable unit written with data, the index value indicative of an identity of said storage drive, wherein said index value identifies a location in a data structure of an identifier of said storage drive, said index value being a different value than said identifier; and
    writing an identifier of the storage drive associated with the index value into the data structure that is stored in a location different than said addressable unit in which the index value is written.

19. The method of claim 18 wherein writing the index value to said addressable unit comprises writing the index value to a header portion of said addressable unit.

20. A non-transitory computer-readable medium containing software that, when executed by a processor, causes the processor to:
    access an addressable unit of a removable storage medium associated with a storage drive to perform a read or write operation;
    write an index value to an addressable unit, said index value identifies a location in a data structure of an identifier of said storage drive, said index value being a different value than said identifier;
    write the identifier of said storage device to the data structure, said data structure stored in a location different than said addressable unit in which the index value is written.

21. The non-transitory computer-readable medium of claim 20 wherein said software further causes the processor to determine if said storage drive has previously written said removable storage medium.

22. The non-transitory computer-readable medium of claim 21 wherein said software further causes the processor to update the data structure contained on said storage medium with a drive identifier associated with said storage drive and with the index value.

23. The non-transitory computer-readable medium of claim 20 wherein said data structure includes said identifier, but not said index value.

24. A method, comprising:
    retrieving information from a removable storage medium; and
    based on the information, determining, on an addressable unit basis, which of a plurality of storage drives was used to store said data on the removable storage medium and in which addressable unit such data was stored.

25. The method of claim 24 wherein retrieving said information comprises retrieving a table from said removable storage medium, said table containing a storage identifier of at least one storage drive.

26. The method of claim 24 wherein retrieving said information comprises retrieving a table from said removable storage medium, said table containing a plurality of storage identifiers, each storage identifier uniquely identifying a storage drive.

27. The method of claim 26 wherein said table further comprises an index value associated with storage identifier, and wherein retrieving said information further comprises retrieving an index value from at least one addressable unit containing data on said removable storage medium.

28. The method of claim 27 further comprising determining if an index value read from the at least one addressable unit containing data matches an index value contained in said table.

29. Non-transitory storage media, comprising:
    a plurality addressable units;
    wherein, in each addressable unit, an index value indicative of an identity of a recording system and user data is stored, said index value identifies a location in a table of an identifier of said recording system, said index value being a different value than said identifier and wherein the table is stored elsewhere than in the addressable unit in which the index value is stored.

30. The non-transitory storage media of claim 29 wherein the table contains identifiers of multiple recording systems.

31. The non-transitory storage media of claim 30 wherein said table does not explicitly comprise any index values.

* * * * *